No. 648,154. Patented Apr. 24, 1900.
D. B. SHANTZ.
MACHINE FOR MAKING BUTTONS.
(Application filed July 20, 1899.)

(No Model.)

Attest
Walter Donaldson

Inventor:
Dilman B. Shantz
by Ellis Spear
Atty

UNITED STATES PATENT OFFICE.

DILMAN B. SHANTZ, OF BERLIN, CANADA.

MACHINE FOR MAKING BUTTONS.

SPECIFICATION forming part of Letters Patent No. 648,154, dated April 24, 1900.

Application filed July 20, 1899. Serial No. 724,572. (No model.)

*To all whom it may concern:*

Be it known that I, DILMAN B. SHANTZ, a subject of the Queen of Great Britain, residing at Berlin, Canada, have invented certain new and useful Improvements in Machinery for Making Buttons, of which the following is a specification.

My invention relates to the manufacture of buttons, and more particularly to improved means whereby the material from which the button-blanks are prepared is sawed into pieces of the required size for making the blanks. The material used is the ivory-nut, and in sawing one of these nuts it is customary to present it to the saw by hand in order to divide it up into sections of the required size. In so doing the core of the nut is left on one of the sections, and it becomes necessary to remove this projecting core, so that this section will be substantially of the same shape and size as the other sections and equally available for preparing a blank therefrom. The removal of this core has been performed by feeding the section carrying it to the saw by hand. This is a delicate operation, owing to the small size of the section carrying the core, it being thin and requiring the workman to bring his fingers in close proximity to the plane of the saw. Skilled labor is therefore necessary in performing this operation, and at best it is attended with danger to the operator, and the work is liable to be damaged or rendered useless by reason of improper feeding.

It is the object of my invention to overcome these difficulties and disadvantages by providing means which will carry and present the piece to be trimmed or cut accurately to the saw, thus dispensing with skilled labor and avoiding all liability of damage to the material being operated on, the invention thus effecting a cheapening in the cost of manufacture and accuracy and uniformity in the work.

My invention is illustrated in the accompanying drawings, in which—

Figure 1:
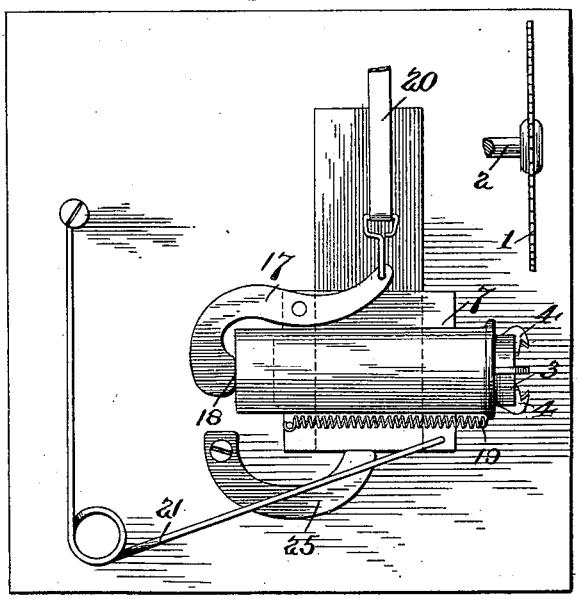
Figure 2:
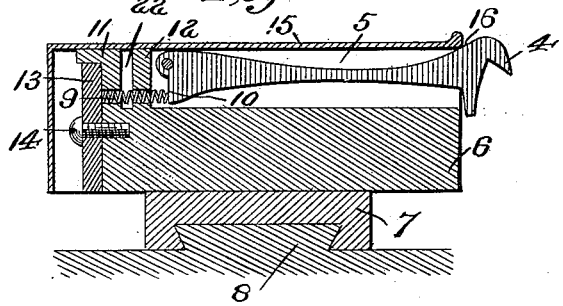

Figure 1 is a plan view of the invention; and Fig. 2 is a sectional view taken longitudinally of the chuck, showing the carrier and guideway in section.

In the drawings the saw is shown at 1, being carried by a shaft 2, which is rotated by any suitable mechanism. (Not shown.) The section of the nut from which the core is to be removed is held by the chuck 3, which consists of the plurality of jaws 4, pivoted within recesses 5 of the head or block 6 and extending longitudinally of the head to project therefrom at one end. I have shown three of these chuck-jaws, but to not confine myself to this number. This chuck-head or block is fixed to a carriage 7, which is adapted to slide on a dovetailed guideway 8. This guideway extends transversely in relation to the axial line of the shaft 2 and to the axial line of the chuck. The chuck-head in moving toward and from the saw remains parallel with the axis of rotation, and the action of the saw thus takes place transversely in relation to the chuck. It will be seen from Fig. 1 that the line of movement of the chuck-jaws is to one side of the saw edge, so that the saw may be effective in its action wholly across the chuck. The chuck-jaws are held normally in open position for receiving the material by springs 9, bearing against the shoulders 10 at the inner pivoted ends of the chuck-jaws. These springs pass through openings in the walls 11 12 of the chuck-head and are held in place by a plate 13, held by a screw 14 at the end of the chuck-head, so as to close the openings and afford bearings for the springs. The chuck-jaws are closed to grip and hold the material by a casing or sleeve 15, arranged to slide longitudinally on the chuck-head and bearing with its edge on the cam-shaped edges 16 of the chuck-jaws. The casing is moved to close the chuck-jaws by a curved lever 17, pivoted to the carriage or block 7 and having one end bearing on the end 18 of the casing. The other end of the lever extends to a point centrally over the guideway and carriage, where it is connected with a strap 20, leading to a treadle or lever, so that when this strap is drawn upon the first effect will be to close the jaws of the chuck onto the piece to be sawed or trimmed, and then by the same action of the strap the carriage is moved along the guideway to present the piece held in the chuck-jaws to the action of the saw. When pressure on the strap is relieved, the carriage is drawn back by a spring 21, connected thereto and to the base of the machine. At the same time the casing or sleeve is retracted on the head or block by the spring 19, attached at one end to the carriage and at the other end to the sleeve, thus allowing the chuck-jaws to open under the action of their springs. In order to allow for the escape of sawdust or dirt from the cavities containing the chuck-jaws, a space is left at 22 between the walls 11 12, in which the sawdust may collect instead of collecting in and about the springs.

The casing may be removed for cleaning or inspection.

At 25 I have shown a stop, against which the carriage abuts when it is returned to normal position.

When pressure is first applied to the strap, the chuck-jaws are operated, as described, to grasp and hold the piece of material, and as the chuck advances toward the saw the increasing resistance of the spring 21 will cause the lever 17 to bear with more force upon the sleeve, and the jaws of the chuck will thus be pressed more firmly upon the material, and this gripping action will thus take place during the movement of the chuck, and the maximum gripping effect will be secured when the saw is operating upon the material, as there will then be the greatest amount of resistance to the movement of the chuck. The initial power being applied to bring the chuck and saw together, the closing of the chuck takes place automatically and without attention from the operator.

I do not wish to limit myself to the means shown for effecting the gripping action during the movement of the chuck nor to the means shown whereby the force applied to move the chuck will also cause the gripping action to take place.

I do not wish to limit myself to the movable chuck as the movable part in bringing the material and saw into engagement, and it will also be understood that the movable chuck may be used in some combination other than with a saw. It will be obvious also that it is only necessary to have a relative movement as between the casing or sleeve and the chuck-head in order to get the closing action of the chuck-jaws, and this effect may be accomplished by means other than those shown.

The chuck is so guided that the pivots of the jaws are always at the same distance from the plane of the side of the saw.

I claim as my invention—

1. In combination with a saw, a chuck comprising movable jaws and automatically-operating means for closing the chuck-jaws as the saw and chuck are brought together, said chuck being arranged with its axis parallel with that of the saw, substantially as described.

2. In combination with a saw, a chuck comprising movable jaws, a sleeve for closing the jaws with means for automatically operating the sleeve as the chuck and saw are brought together, said sleeve and chuck being arranged with their axes parallel with that of the saw, substantially as described.

3. In combination with a saw, a chuck having jaws movable transversely with respect to the axis of the saw, but with their pivots fixed with reference to the plane of the saw, means for closing the jaws of the chuck and connections for moving the chuck, said connections extending to and being connected with said means to act thereon to close the chuck-jaws and move the chuck, substantially as described.

4. In combination with a saw, a chuck having jaws movable transversely with respect to the axis of the saw but with their pivots fixed with reference to the plane of the saw, automatically-operating means for closing the chuck-jaws and operating means for bringing the chuck and saw into action without disturbing the parallelism of their axes, substantially as described.

5. In combination, the chuck, means for closing the jaws of the chuck, and connections for moving the chuck, said connections extending to and being connected with said means to act thereon to close the chuck-jaws and move the chuck, substantially as described.

6. In combination, the chuck having jaws, the carriage for the chuck, the lever on the carriage, means operated thereby to close the chuck-jaws and means for moving the chuck, said means being connected with said lever, substantially as described.

7. In combination, the carriage, the chuck thereon having the jaws, the movable casing or sleeve for closing the jaws and the lever acting on the sleeve with means for operating the lever, substantially as described.

8. In combination, the chuck having the jaws, the carrier for the chuck, means for moving the chuck, a sleeve movable in relation to the chuck for closing the jaws and means for operating the sleeve, said means being rendered effective when force is applied to move the chuck, substantially as described.

9. In combination, the saw and chuck one of which is movable toward and from the other and jaws carried by the chuck, the movement of one of the parts causing the saw to act transversely across the face of the chuck, substantially as described.

10. In combination, the saw, the chuck-head carrying chuck-jaws and with its axis parallel with the axis of the saw, a sleeve movable longitudinally of the chuck-head and means for operating the sleeve, substantially as described.

11. In combination, the chuck-head, the chuck-jaws pivoted in recesses therein, the springs bearing against shoulders at the rear ends of the chuck-jaws, said springs being contained in openings in the chuck-head and a plate secured over the openings to hold the springs in place, substantially as described.

12. In combination, the chuck-head, the chuck-jaws pivoted therein the two walls on the chuck-head with a space between and an opening in one of the walls leading to the space for the passage of dust, the said chuck-jaws being under pressure of springs located in said openings, substantially as described.

13. In combination, the saw, the chuck-head, one of said parts being movable toward and from the other, the jaws carried by the chuck and pivoted at one end and guiding means for maintaining these pivots at the same distance from the saw throughout the sawing operation, substantially as described.

14. In combination, a chuck comprising movable jaws, a device for acting upon the material held by the chuck, said device and chuck being arranged with their axes parallel, and means for closing the chuck actuated by the same force which brings the chuck and said device together, substantially as described.

15. In combination with a saw, a chuck comprising movable jaws and operating means for closing the chuck-jaws as the saw and chuck are brought together, said chuck being arranged with its axis parallel with that of the saw, substantially as described.

In testimony whereof I affix my signature in presence of two witnesses.

DILMAN B. SHANTZ.

Witnesses:
F. L. MIDDLETON,
HENRY E. COOPER.